(12) United States Patent
Liu et al.

(10) Patent No.: US 9,146,118 B2
(45) Date of Patent: Sep. 29, 2015

(54) NAVIGATION SYSTEM WITH POINT OF INTEREST DETOUR MECHANISM AND METHOD OF OPERATION THEREOF

(71) Applicant: Telenav, Inc., Sunnyvale, CA (US)

(72) Inventors: Xiang Liu, Sunnyvale, CA (US); Kumar Maddali, San Ramon, CA (US); Changzheng Jiang, Santa Clara, CA (US)

(73) Assignee: TELENAV INC., Sunnyvale, CA (US)

( * ) Notice: Subject to any disclaimer, the term of this patent is extended or adjusted under 35 U.S.C. 154(b) by 0 days.

(21) Appl. No.: 14/231,289

(22) Filed: Mar. 31, 2014

(65) Prior Publication Data

US 2015/0241225 A1   Aug. 27, 2015

Related U.S. Application Data

(60) Provisional application No. 61/945,677, filed on Feb. 27, 2014.

(51) Int. Cl.
| | | |
|---|---|---|
| *G01C 21/26* | (2006.01) | |
| *G01C 21/34* | (2006.01) | |
| *G01C 21/36* | (2006.01) | |
| *G08G 1/0968* | (2006.01) | |

(52) U.S. Cl.
CPC ............ *G01C 21/34* (2013.01); *G01C 21/26* (2013.01); *G01C 21/3415* (2013.01); *G01C 21/3682* (2013.01); *G08G 1/0968* (2013.01); *G01C 21/3667* (2013.01)

(58) Field of Classification Search
CPC .... G01C 21/26; G01C 21/34; G01C 21/3415; G01C 21/3476; G01C 21/3484; G01C 21/3617; G01C 21/3679; G01C 21/3682; G08G 1/0968
See application file for complete search history.

(56) References Cited

U.S. PATENT DOCUMENTS

| | | | |
|---|---|---|---|
| 6,434,482 B1* | 8/2002 | Oshida et al. ................ | 701/426 |
| 7,054,742 B2* | 5/2006 | Khavakh et al. ............. | 701/411 |
| 7,194,357 B2* | 3/2007 | Smith .......................... | 701/533 |
| 7,532,978 B2* | 5/2009 | Upparapalli et al. ........ | 701/420 |
| 7,881,863 B2* | 2/2011 | Uyeki et al. .................. | 701/414 |
| 8,335,643 B2 | 12/2012 | Vandivier et al. | |
| 8,600,659 B1* | 12/2013 | Scherzinger .................. | 701/400 |
| 2010/0305842 A1* | 12/2010 | Feng ............................ | 701/201 |
| 2012/0123678 A1* | 5/2012 | Poppen et al. ................ | 701/468 |
| 2012/0197714 A1* | 8/2012 | Beyeler et al. ............ | 705/14.49 |
| 2013/0138341 A1 | 5/2013 | Poppen et al. | |
| 2015/0106011 A1* | 4/2015 | Nesbitt ......................... | 701/412 |

\* cited by examiner

*Primary Examiner* — Michael J Zanelli
(74) *Attorney, Agent, or Firm* — IP Investment Law Group

(57) ABSTRACT

A navigation system includes: a control unit configured to generate a navigation route; generate a route-specific point set based on the navigation route prior to an interest point query for representing a portion of an interest point database; and a storage unit, coupled to the control unit, configured to store the route-specific point set.

20 Claims, 6 Drawing Sheets

NAVIGATION SYSTEM WITH POINT OF INTEREST DETOUR MECHANISM AND METHOD OF OPERATION THEREOF

CROSS-REFERENCE TO RELATED APPLICATION

This application claims the benefit of U.S. Provisional Patent Application Ser. No. 61/945,677 filed Feb. 27, 2014, and the subject matter thereof is incorporated herein by reference thereto.

TECHNICAL FIELD

The present invention relates generally to a navigation system, and more particularly to a system with a point of interest (POI) detour mechanism.

BACKGROUND

Modern portable consumer and industrial electronics, especially client devices such as navigation systems, cellular phones, portable digital assistants, and combination devices, are providing increasing levels of functionality to support modern life including location-based information services. Research and development in the existing technologies can take myriad directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND), or a personal digital assistant (PDA).

Navigation systems and location based services enabled systems have been incorporated in automobiles, notebooks, handheld devices, and other portable products. Today, these systems aid users by incorporating available, real-time relevant information, such as maps, directions, local businesses, or other POIs.

However, a search for POIs often produce unsatisfactory search results. Thus, a need still remains for a navigation system with a POI detour mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a navigation system, including: a control unit, configured to generate a navigation route; generate a route-specific point set based on the navigation route prior to an interest point query for representing a portion of an interest point database; and a storage unit, coupled to the control unit, configured to store the route-specific point set.

An embodiment of the present invention provides a method of operation of a navigation system including: generating, with a control unit, a navigation route; generating a route-specific point set based on the navigation route prior to an interest point query for representing a portion of an interest point database; and storing, with a storage unit coupled to the control unit, the route-specific point set.

An embodiment of the present invention provides a non-transitory computer readable medium including: generating, with a control unit, a navigation route; generating a route-specific point set based on the navigation route prior to an interest point query for representing a portion of an interest point database; and storing, with a storage unit coupled to the control unit, the route-specific point set.

Certain embodiments of the invention have other steps or elements in addition to or in place of those mentioned above. The steps or element will become apparent to those skilled in the art from a reading of the following detailed description when taken with reference to the accompanying drawings.

DETAILED DESCRIPTION

Figure 1:
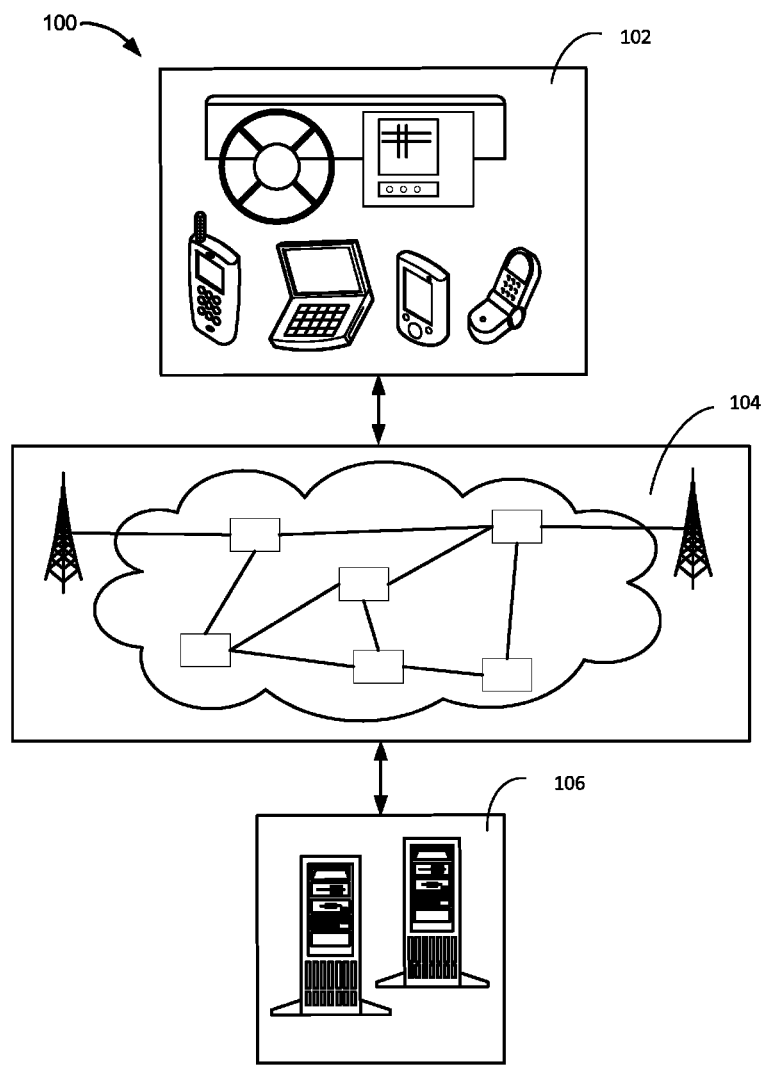
FIG. 1 is a navigation system with point of interest classification mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation.

One skilled in the art would appreciate that the format with which navigation information is expressed is not critical to some embodiments of the invention. For example, in some embodiments, navigation information is presented in the format of (X,Y), where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to point of interest to the user, such as local business, hours of businesses, types of businesses, advertised specials, traffic information, maps, local events, and nearby community or personal information.

The term "module" referred to herein can include software, hardware, or a combination thereof of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with a point of interest (POI) detour mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or a combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
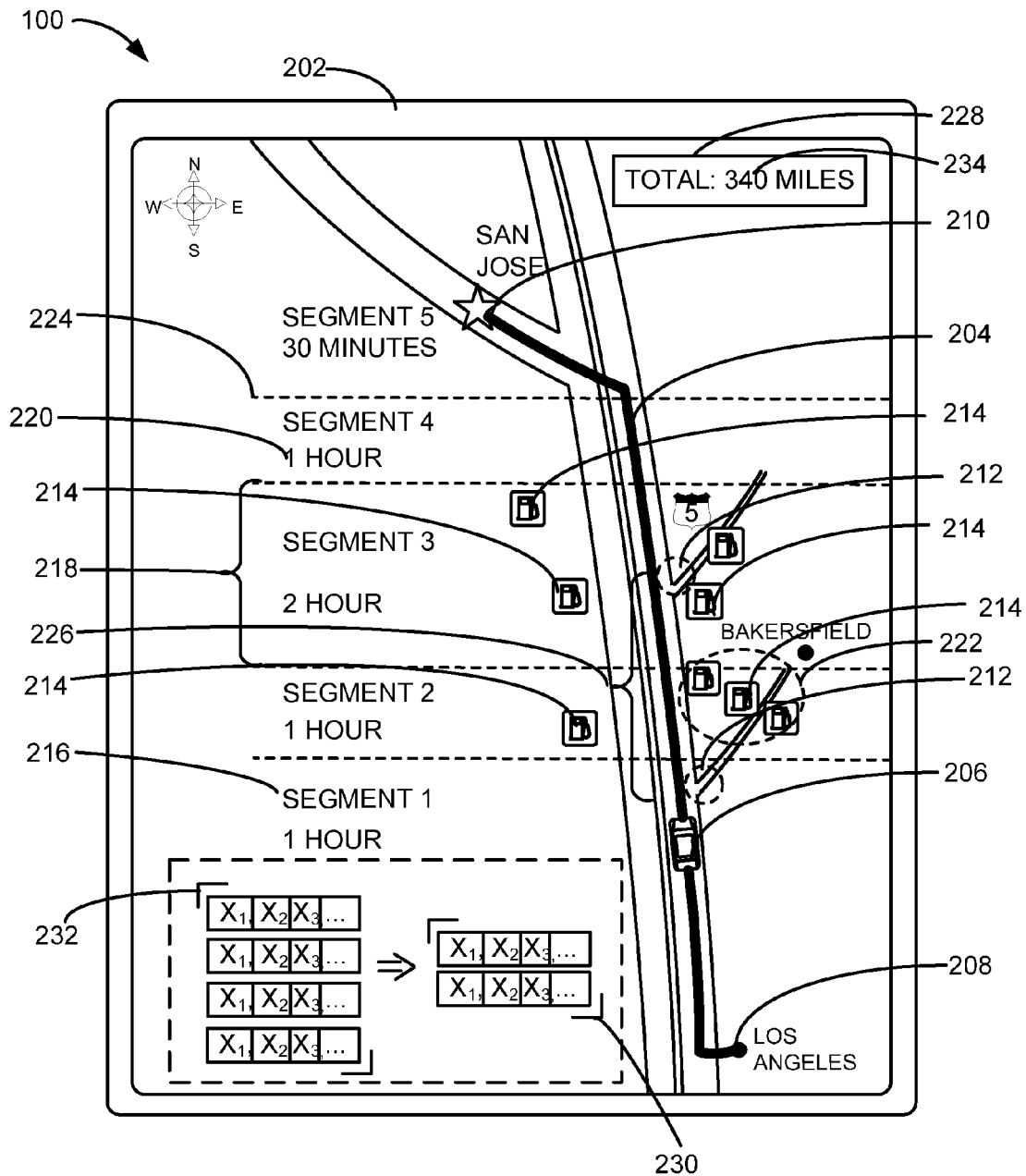
FIG. 2 is an example of a display on a display interface of the first device.

Referring now to FIG. 2 therein is shown an example of a display interface 202 of the first device 102. The display interface 202 can depict a navigation route 204 generated by the navigation system 100 of FIG. 1. The navigation route 204 is a guidance path provided by a navigation system. For example, the display interface 202 can depict the navigation route 204 as a driving route from Los Angeles to San Jose as depicted in FIG. 2. Also for example, the navigation route 204 can represent other types of routes, such as a cycling route from San Francisco to Marin or a bus transportation route from New York to Boston.

The navigation system 100 can represent the navigation route 204 as a highlighted path on a map layout depicted on the display interface 202. In addition, the navigation system 100 can represent the navigation route 204 as a dynamic or static list of text or audible instructions. The navigation system 100 can also depict a current location 206 of the first device 102 on the navigation route 204. The current location 206 is a real-time geographic position of a device. The current location 206 can be a real-time geographic position of the first device 102 being used by a user (not shown). The current location 206 can be shown as an icon, an object, a symbol, or a combination thereof on the navigation route 204.

The navigation route 204 can dynamically update as the first device 102 deviates from the navigation route 204. For example, the navigation system 100 can recalculate the navigation route 204 from the current location 206 of the first device 102 when the first device 102 deviates from the highlighted path, fails to follow guidance instructions, or a combination thereof. Alternatively, the navigation route 204 can remain the same when the first device 102 deviates from the navigation route 204.

The navigation system 100 can generate the navigation route 204 using a tree search algorithm, a graph search algorithm, or a combination thereof. The navigation system 100 can also update the navigation route 204 based on a search criteria such as shortest route, shortest travel time, avoid highways, avoid traffic, or a combination thereof.

The navigation route 204 can proceed from a starting point 208 and end at a target destination 210. The starting point 208 is the starting location of a navigation path. For example, the display interface 202 can show the starting point 208 of the navigation route 204 as Los Angeles, Calif. The starting point 208 can be determined based on a location information received from the first device 102, the current location 206, or based on an input from another device. The target destination 210 is an end location of a navigation path. For example, the display interface 202 can show the target destination 210 as San Jose, Calif. The target destination 210 can represent a location intended as a main purpose or a goal associated with the navigation route 204.

The display interface 202 can also depict access points 212 for reaching one or more interest points 214. The interest points 214 can include a point of interest (POI), such as a dining establishment, a fueling station, a lodging establishment, a business establishment, an educational establishment, a landmark, a scenic viewpoint, an object, a coordinate, or a combination thereof. The interest points 214 can be presented as text, icons, images, objects, or a combination thereof on a map layout. In addition, the interest points 214 can be presented as coordinates or an address.

The access points 212 are exits or outlets connecting a navigation path with a waypoint. The waypoint can include any of the interest points 214, a specific geographic location or coordinate, an entity at the specific geographic location, or a combination thereof. The access points 212 can be a connection between the navigation route 204 and a path or a segment leading to the interest points 214. For example, the access points 212 can include a highway exit, a freeway off-ramp, a toll-way exit, a freeway turnout, an intersection, or an expressway access road. Also for example, the access points 212 can include a bus stop, a train stop, a shuttle stop, or a bike access road.

The display interface 202 can show the navigation route 204 divided into route segments 216 by the navigation system 100. The route segments 216 are smaller segments of a larger navigation path. For example, display interface 202 can show the navigation route 204 divided into five of the route segments 216.

The route segments 216 can depend on the length of the navigation route 204. For example, when the navigation route 204 involves a cross-country drive, the navigation route 204 can be divided into multiple instances of the route segments 216. In some circumstances, the navigation route 204 can first be divided into the route segments 216 and each of the route segments 216 can further be divided into sub-segments of even smaller lengths.

The navigation system 100 can divide the navigation route 204 into the route segments 216 based on a segment length 218, a segment travel time 220, an interest density 222, or a combination thereof. The segment length 218 is a distance measurement of a road or path segment. For example, the display interface 202 can show the navigation route 204 divided into five segments each with different instances of the segment length 218. Also for example, the navigation system 100 can divide the navigation route 204 into three segments with identical instances of the segment length 218. The segment length 218 of the route segments 216 can also be based on the interest density 222

The segment travel time 220 is the time required to traverse a road or path segment. For example, the segment travel time 220 can be an estimate of the time required to travel the length of one or more of the route segments 216. The navigation system 100 can divide the navigation route 204 by the segment travel time 220 when a particular stretch of the navigation route 204 involves driving conditions exceeding or not meeting a threshold predetermined by the navigation system 100. For example, the driving conditions can be a speed limit for the particular stretch of the navigation route 204 and the predetermined threshold can be a national average speed limit.

Also, for example, one of the route segments 216 of the navigation route 204 can pass through a stretch of the navigation route 204 categorized as "mountainous terrain" or "difficult to navigate." In this example, the time required to traverse this stretch of the navigation route 204 can be out of proportion with the segment length 218. Also for example, one of the route segments 216 can pass through a stretch of the navigation route 204 categorized as "flat roads" or "easy to navigate." In this example, the time required to traverse this stretch of the navigation route 204 can be lower than expected based on a posted speed limit.

The route segments 216 can be divided or demarcated by segment boundaries 224. The segments boundaries 224 are coordinate markers or labels representing the end of one of the route segments 216 and the beginning of another of the route segments 216. The navigation system 100 can store the segment boundaries 224 as distance values relative to the starting point 208, the target destination 210, or a combination thereof.

The display interface 202 can also depict an access gap 226 within one of the route segments 216. The access gap 226 is a portion of a navigation path where the distance between exits or outlets exceeds a threshold distance value. For example, the access gap 226 can be a portion of the navigation route 204 where the distance between the access points 212 exceeds the threshold distance value. The threshold distance value can be a value predetermined by the navigation system 100. For example, if the threshold distance value is a predetermined distance value, the access gap 226 can be any stretch of the route segments 216 where the distance between the access points 212 exceeds the predetermined distance value.

The interest density 222 is a measure of the concentration of POIs within given area or within a set travel time. For example, the interest density 222 can refer to the quantity of the interest points 214 within a 5 mile radius of one of the access points 212. In addition, the interest density 222 can refer to the quantity of the interest points 214 in one or more of the route segments 216 or associated with one of the access points 212.

The navigation system 100 can classify the navigation route 204 as an extended outing 228. The extended outing 228 represents an excursion in excess of a mileage threshold 234. For example, the extended outing 228 can involve a travel route where the distance between the starting point 208 and the target destination 210 of the travel route is in excess of the mileage threshold 234 of 200 miles. The navigation system 100 can divide the navigation route 204 into the route segments 216 when the navigation route 204 is considered the extended outing 228.

The navigation system 100 can determine the extended outing 228 based on the navigation route 204, a length thereof, the interest density 222, or a combination thereof. For example, if the interest density 222 exceeds a threshold value predetermined by the navigation system 100 for a stretch of the navigation route 204, the navigation system 100 can lower the mileage threshold 234 for the extended outing 228. As a more specific example, the navigation route 204 can be a 50 mile trip along U.S. Route 101 from San Francisco to San Jose. The navigation system 100 can determine this instance of the navigation route 204 as the extended outing 228 because the interest density 222 exceeds the mileage threshold 234 predetermined by the navigation system 100 despite the length of the navigation route 204.

The navigation system 100 can generate a route-specific point set 230 for representing a portion of an interest point database 232 based on the navigation route 204. The interest point database 232 is a collection of data for providing navigation guidance to destinations of interest. The interest point database 232 can include geographic information, map information, navigation information, traffic information, road information, or a combination thereof. The interest point database 232 can include static information, dynamic information, or a combination thereof. The interest point database 232 can include a map and a comprehensive list of the POIs associated with the map.

The interest point database 232 can organize the data by a large geographic locale such as a city, a county, a state, or a combination thereof. For example, the interest point database 232 can include geographic or navigation information on all of the interest points 214 in San Mateo County. In addition, the interest point database 232 can organize the data by a predefined geographic radius. For example, the interest point database 232 can include navigation information on all of the interest points 214 within a 100 mile radius of a geographic reference point.

The interest point database 232 can include information from a Geographic Information System (GIS) database, a Global Navigation Satellite System (GNSS) database, a map database management system, a Global Positioning System (GPS) database, a user-generated database, or a combination thereof. In addition, the interest point database 232 can be implemented as a relational database, an array database, a columnar database, an object oriented database, or a combination thereof.

The interest points 214 stored in the interest point database 232 can be classified by identifiers or keywords. The identifiers or keywords can be linked to names, coordinates, or a description of the interest points 214. For example, the interest point database 232 can include information concerning the geographic location of all gas stations in a recognized geographic region. For example, the recognized geographic region can be the county of Santa Clara or the state of California.

The route-specific point set 230 is a subset of data created from a larger database and associated with a guidance route. For example, the route-specific point set 230 can be constructed using data from the interest point database 232 and can correspond to portions of the navigation route 204. The route-specific point set 230 can be generated concurrently with or subsequent to the generation of the navigation route 204.

The route-specific point set 230 can be generated based on the access points 212. A unique instance of the route-specific point set 230 can be generated for each instance of the navigation route 204. For example, one instance of the route-specific point set 230 can include all of the interest points 214 along the navigation route 204 reachable from the access points 212 on the navigation route 204. As a more specific example, the route-specific point set 230 can include driving directions, bicycling directions, walking directions, public transportation directions, hiking directions, or a combination thereof.

The navigation system 100 can generate the route-specific point set 230 by extracting data from the interest point database 232 using a keyword or identifier associated with the access points 212. For example, if one of the access points 212 is Interstate Exit 120A, the navigation system 100 can create the route-specific point set 230 by pointing to data tagged with the term "120A." The route-specific point set 230 can be based on traffic information, navigation information, road conditions, or safety conditions concerning how to reach the interest points 214 from the access points 212. In addition, multiple instances of the route-specific point set 230 can be created for each instance of the navigation route 204.

The navigation system 100 can generate the route-specific point set 230 as a sub-set of the interest points 214 after or along with calculating the navigation route 204 according to the access points 212 therein. The navigation system 100 can use the route-specific point set 230 for supporting the user when traversing the navigation route 204.

It has been discovered that the route-specific point set 230 based on the access points 212 specific to the navigation route 204 provides shorter search times and an improved user experience. The navigation system 100 can use the route-specific point set 230 to process and provide necessary information instead of the interest point database 232. The route-specific point set 230 can provide a smaller set of data for increasing efficiency and information directly relevant to the navigation route 204 traversed by the user for providing relevant information to the user.

It has further been discovered that the route-specific point set 230 based on the access points 212 for one relevant or upcoming instance of the route segments 216 provides further improved efficiency. The navigation system 100 can process a smaller instance or collection of the route-specific point set 230 relevant to the current location 206 as a search field instead of all data relevant to an entirety of the navigation route 204.

The route-specific point set 230 can be generated using a series of filters. The route-specific point set 230 can also be generated after the navigation route 204 has been divided into the route segments 216. Details regarding the route-specific point set 230 will be discussed in the following sections. In addition, the interest point database 232 can be implemented as a relational database, an array database, a columnar database, an object oriented database, or a combination thereof.

Figure 3:
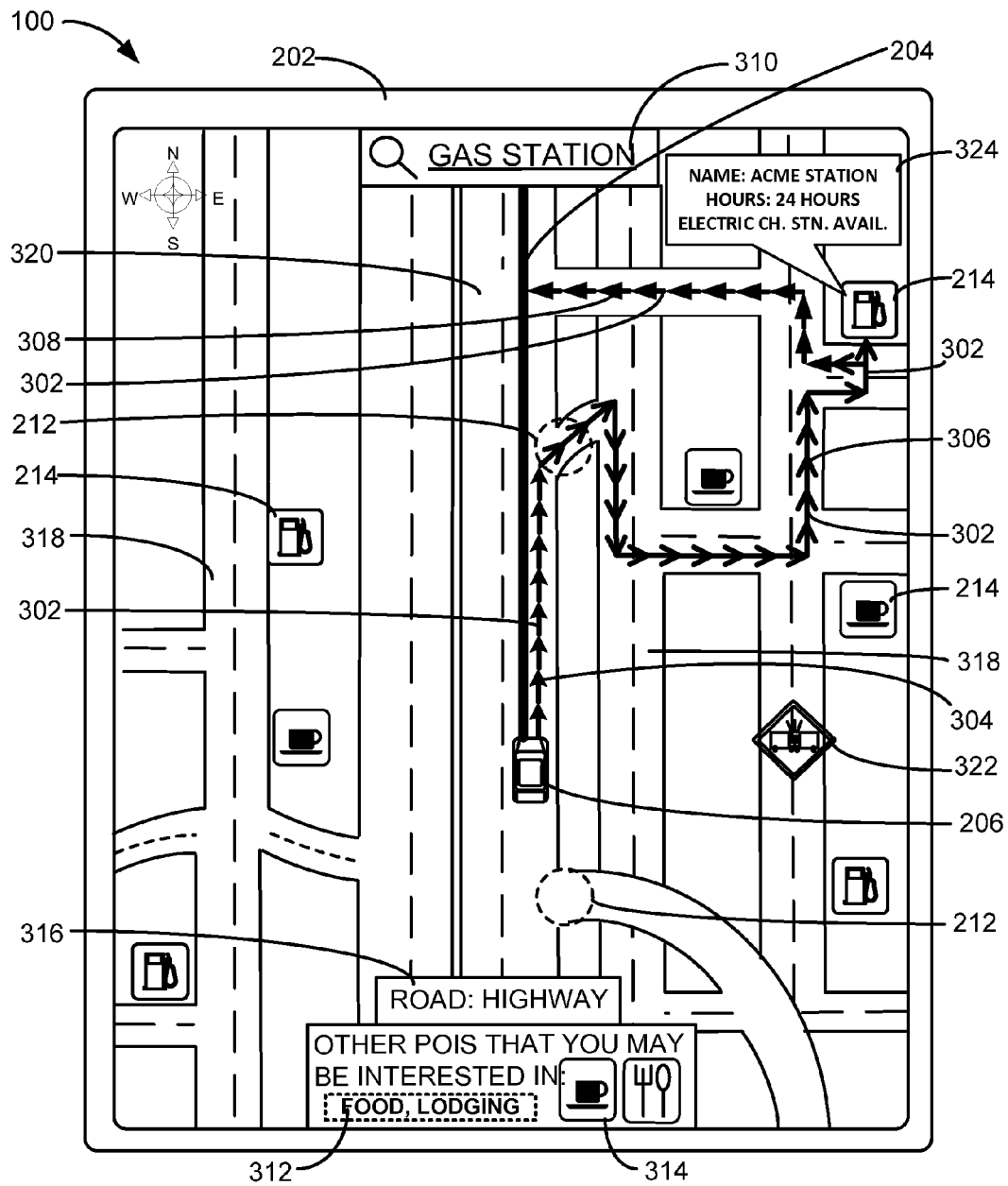
FIG. 3 is an example of another display on the display interface of the first device.

Referring now to FIG. 3 there is shown another example display on the display interface 202 of the first device 102. The display interface 202 shows an up-close view of the current location 206 of the first device 102 on the navigation route 204.

The display interface 202 also shows an example of a detour route 302 calculated by the navigation system 100. The detour route 302 is a route for reaching one or more of the interest points 214 and returning to the navigation route 204. The display interface 202 can present the detour route 302 using a different graphical technique than the navigation route 204 to distinguish it from the navigation route 204.

The detour route 302 can include access routes 304, exit routes 306, return routes 308 or a combination thereof. The access routes 304 are routes for reaching the access points 212 from the current location 206. The exit routes 306 are routes for reaching the interest points 214 from the navigation route 204. The return routes 308 are routes for returning to the navigation route 204 from the interest points 214. The return routes 308 can include a portion of the exit routes 306. For example, the return routes 308 can include a reverse path of the exit routes 306. In addition, the return routes 308 and the exit routes 306 can each be associated with different instances of the access points 212. The exit routes 306 or the return routes 308 can be previously calculated from the route-specific point set 230.

The display interface 202 can depict an interest point query 310. The interest point query 310 is an input for identifying an object of a search. For example, the interest point query 310 can be input information identifying a request for a service, a good, a specific geographic location, an entity at the specific geographic location, or a combination thereof. The interest point query 310 can include a search string, a search command, an icon selection, a scroll selection, a gesture command, a voice command, an auditory command, a sensor input, a randomly generated input, or a combination thereof.

For example, the display interface 202 can depict a search box with the search string "Gas Station" as the interest point query 310. The navigation system 100 can also receive the interest point query 310 when a user (not shown) taps on an icon representing one of the interest points 214. Also for example, the navigation system 100 can receive the interest point query 310 through a voice command.

The navigation system 100 can identify an intention criteria 312 corresponding to the interest point query 310. The intention criteria 312 is a category label applied to the interest point query 310. The intention criteria 312 can be based on a context of the interest point query 310. The context can include a timing of the interest point query 310, a past instance of the interest point query 310, or a combination thereof.

For example, the navigation system 100 can apply the label of "food" or "hunger" to a query involving the search term "restaurant" received during meal times. Alternatively, the navigation system 100 can apply a different label of "restroom" or "break" to the same query received outside of meal times or immediately after a previous detour involving the same query.

The navigation system 100 can generate an alternative interest suggestion 314 based on the interest point query 310, the intention criteria 312, or a combination thereof. The alternative interest suggestion 314 is an alternative search term or search value based on the intention criteria 312. The navigation system 100 can generate the alternative interest suggestion 314 based on a previous behavior of the user, a previous detour, a previous route, or a combination thereof. For example, the navigation system 100 can generate suggestions for cafes or supermarkets in response to the interest point query 310 involving the term "restaurant."

The navigation route 204 can include roads of more than one road type 316. The road type 316 can include an accessible roadway 318 or a limited access roadway 320. The accessible roadway 318 is a road or conduit with access to outlets or exits on both sides of the roads or conduits. The outlets or exits can include the access points 212. Examples of the accessible roadway 318 can include a frontage road, a service road, a municipal road, or a local road without medians, left-turn or right-turn restrictions, center barriers, or a combination thereof. In addition, examples of the accessible roadway 318 can include a non-divided high-speed road such as a non-divided highway, a non-divided freeway, or a non-divided toll-way.

The limited access roadway 320 is a road or conduit without access to outlets or exits on both sides of the road or conduit. Examples of the limited access roadway 320 can include a divided high-speed road such as a divided highway, a divided freeway, a divided toll-way, a divided turnpike, or a divided expressway. In addition, examples of the limited access roadway 320 can include a frontage road, a service road, a municipal road, or a local road with medians, left-turn or right-turn restrictions, center barriers, or a combination thereof.

The display interface 202 can depict an example of a road condition alert 322 received by the navigation system 100. The road condition alert 322 is a traffic or safety warning concerning a roadway. For example, the road condition alert 322 can be a warning for an accident near one of the interest points 214. As an additional example, the road condition alert 322 can notify the user of one of the access points 212 being closed due to road maintenance. In addition, the road condition alert 322 can notify the user of increasing traffic surrounding one of the interest points 214 due to the rush hour commute.

The display interface 202 can also display a locational profile 324 of one or more of the interest points 214. The locational profile 324 is a vendor, business, or supplemental information concerning a specific geographic location or an entity at the specific geographic location. The vendor or business information can include names of the interest points 214, operational hours of the interest points 214, amenities offered by the interest points 214, reviews of the interest points 214, or a combination thereof.

For example, the locational profile 324 of a restaurant can include information on the name of the restaurant, the type of food served by the restaurant, whether the restaurant has a restroom, or whether the restaurant serves food past a certain time. Also for example, the locational profile 324 of a hospital can include information on the hours of operation of the hospital's emergency room, the type of patients accepted by the hospital, or the parking situation at the hospital.

Figure 4:
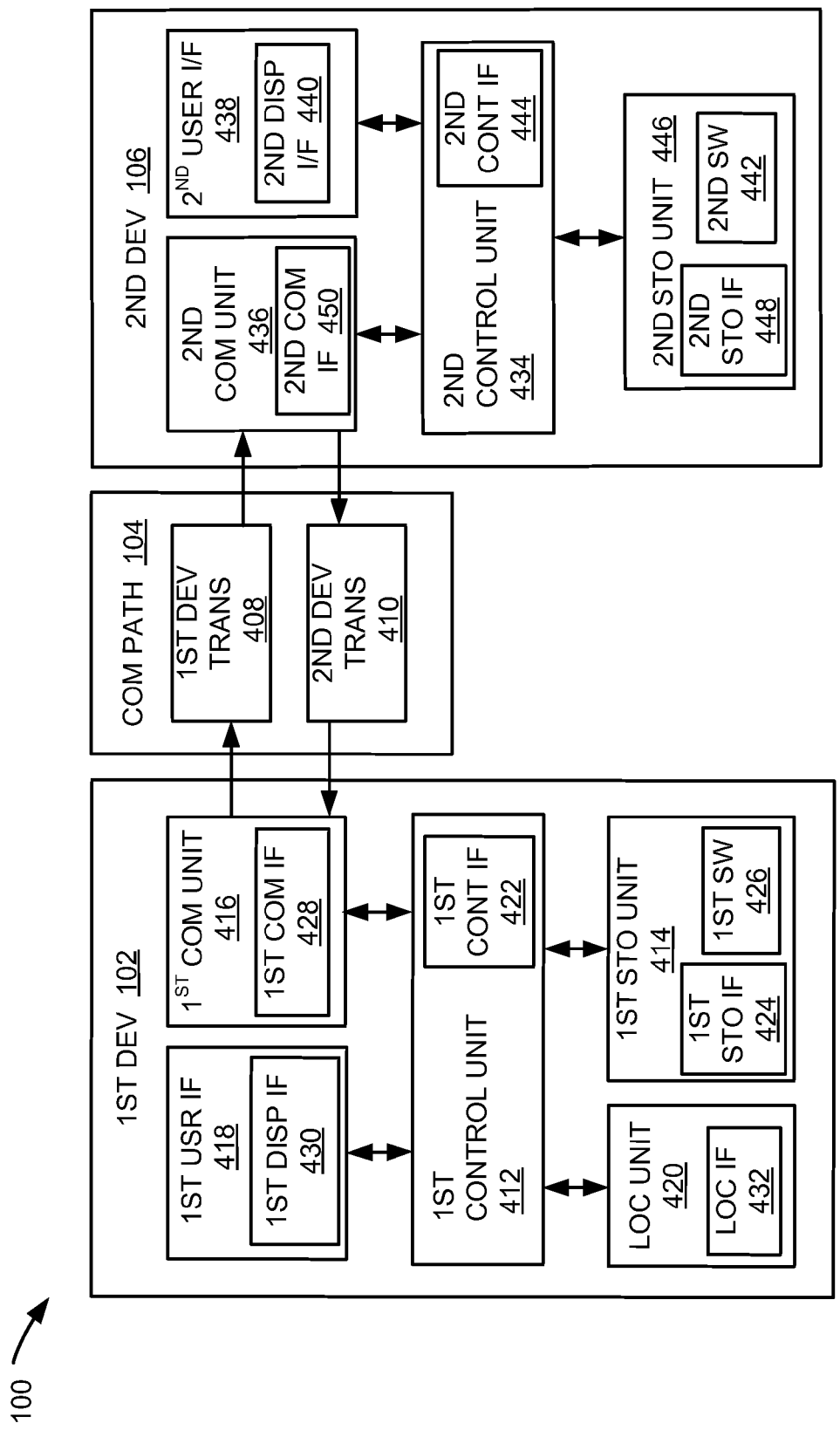
FIG. 4 is an exemplary block diagram of the navigation system.

Referring now to FIG. 4 therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first device 102 can be similarly described by the first device 102.

The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations external to the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate a location information, a current heading, and a current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations external to the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, point of interest (POI), navigation routing entries, reviews/ratings, feedback, traffic patterns, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations external to the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106 of FIG. 1, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, or any combination thereof to provide data and communication inputs.

The first user interface 418 can include a first display interface 430. The first display interface 430 can include a display, a projector, a video screen, a speaker, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows the user to interface and interact with the second device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second controller interface 444. The second controller interface 444 can be used for communication between the second control unit 434 and other functional units in the second device 106. The second controller interface 444 can also be used for communication that is external to the second device 106.

The second controller interface 444 can receive information from the other functional units or from external sources, or can transmit information to the other functional units or to external destinations. The external sources and the external destinations refer to sources and destinations external to the second device 106.

The second controller interface 444 can be implemented in different ways and can include different implementations depending on which functional units or external units are being interfaced with the second controller interface 444. For example, the second controller interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest, navigation routing entries, reviews/ratings, feedback, traffic patterns, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations external to the second device 106.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
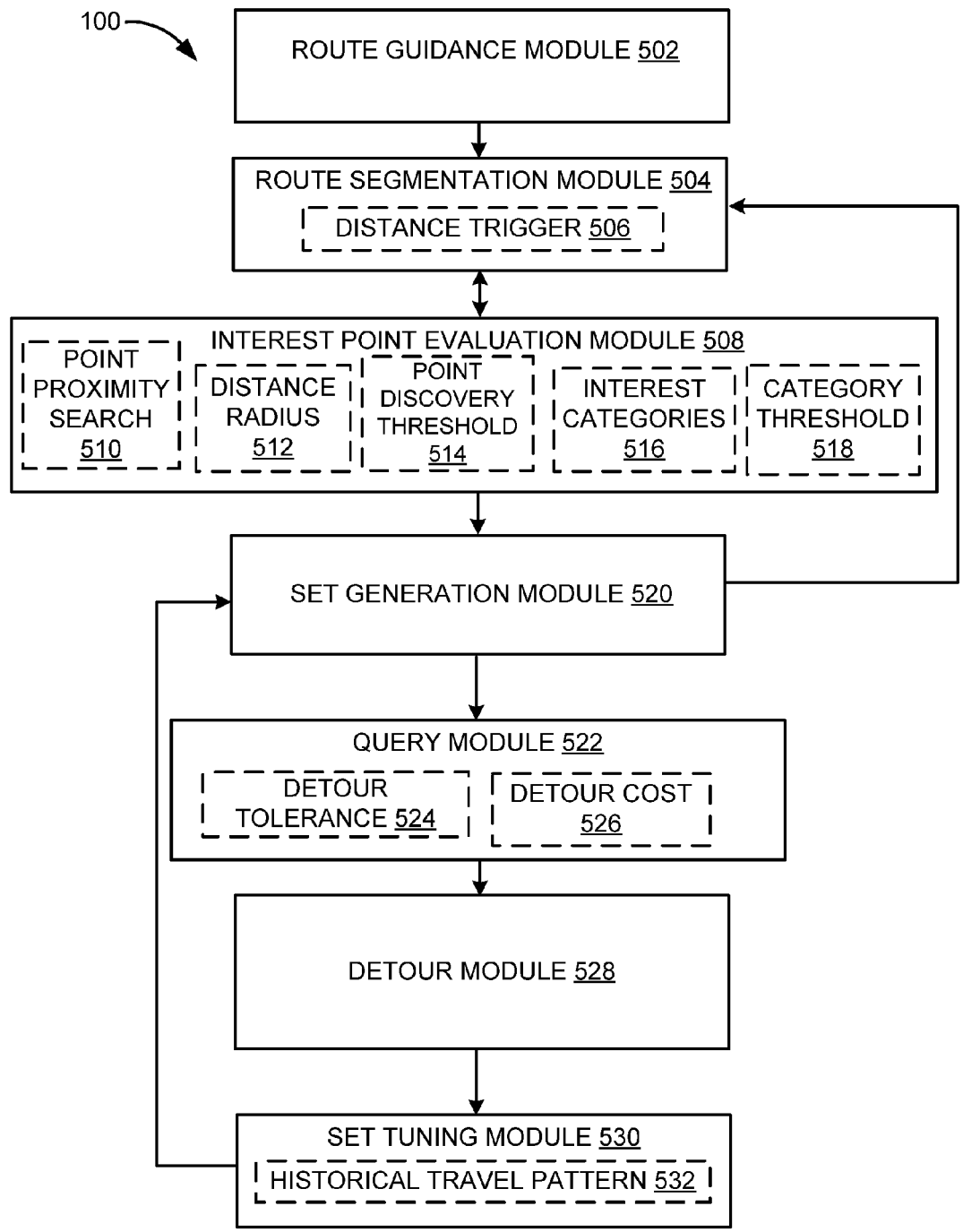
FIG. 5 is a control flow of the navigation system.

Referring now to FIG. 5, therein is shown a control flow of the navigation system 100 with a POI detour mechanism. The navigation system 100 can include a route guidance module 502, a route segmentation module 504, an interest point evaluation module 508, a set generation module 520, a query module 522, a detour module 528, a set tuning module 530, or a combination thereof.

The route guidance module 502 can be coupled to the route segmentation module 504 using wired or wireless connections, by having an output of one module as an input of the other module, by having operations of one module influence operations of the other module, or a combination thereof. Similarly, the route segmentation module 504 can be coupled to the interest point evaluation module 508, the set generation module, or a combination thereof. Further, the interest point evaluation module 508 can be coupled to the set generation module 520. The set generation module can be coupled to the query module 522, the set tuning module 530, or a combination thereof. The query module 522 can be coupled to the detour module 528, the detour module 528 can be coupled to the set tuning module 530, or a combination thereof as described above.

The route guidance module 502 is for generating the navigation route 204 of FIG. 2 and identifying the access points of FIG. 2 along the navigation route 204. The route guidance module 502 can generate the navigation route 204 based on the starting point 208 of FIG. 2 and the target destination 210 of FIG. 2. The route guidance module 502 can use the first user interface 418 of FIG. 4, the second user interface 438 of FIG. 4, or a combination thereof to receive the starting point 208, the target destination 210, or a combination thereof from a user (not shown). The route guidance module 502 can also use the location unit 420 of FIG. 4 to determine the starting point 208.

The route guidance module 502 can use the first control unit 412 of FIG. 4, the second control unit 434 of FIG. 4, or a combination thereof to generate the navigation route 204 based on the starting point 208 and the target destination 210. The route guidance module 502 can determine the navigation route 204 using a tree traversal mechanism, a graph traversal mechanism, or a combination thereof. More specifically, the route guidance module 502 can use an A* algorithm, a Bellman-Ford algorithm, a bidirectional algorithm, a Dijkstra's algorithm, a Floyd-Warshall algorithm, an iterative deepening algorithm, a shortest path algorithm, or a combination thereof.

The route guidance module 502 can also generate the navigation route 204 based on an additional criteria provided by the user. The additional criteria can include shortest travel time, avoid highways, avoid traffic, or a combination thereof. The route guidance module 502 can receive the additional criteria from the first user interface 418, the second user interface 438, or a combination thereof. The route guidance module 502 can also generate the navigation route 204 based on accessing the additional criteria from a previously generated instance of the navigation route 204 or a user setting stored in the first storage unit 414 of FIG. 4, the second storage unit 446 of FIG. 4, or a combination thereof.

The route guidance module 502 can determine the current location 206 of the first device 102 on the navigation route 204. The route guidance module 502 can use the location unit 420, the first control unit 412, the second control unit 434, or a combination thereof to determine the current location 206. The route guidance module 502 can determine the current location 206 using a map matching approach, a vector approach, or a combination thereof. The route guidance module 502 can also dynamically update or change the navigation route 204 when the current location 206 deviates from the navigation route 204.

The route guidance module 502 can identify the access points 212 along the navigation route 204 by accessing or searching a map database, the interest point database 232 of FIG. 2, or a combination thereof. The map database or the interest point database 232 can be stored in the first storage unit 414, the second storage unit 446, or a combination thereof. The route guidance module 502 can access the map database, the interest point database 232, or a combination thereof using the first control unit 412, the second control unit 434, the first control interface 422 of FIG. 4, the second control interface 444 of FIG. 4, the first communication unit 416 of FIG. 4, the second communication unit 436 of FIG. 4, or a combination thereof.

The route guidance module 502 can identify the access points 212 by searching or filtering the map database, the interest point database 232, or a combination thereof. The route guidance module 502 can identify the location or geospatial coordinates of the access points 212. The route guidance module 502 can then use the first control unit 412, the second control unit 434, or a combination thereof to determine the distance between the access points 212, the anticipated travel time between the access points 212, the density of the access points 212 based on the location or geospatial coordinates of the access points 212, or a combination thereof.

The route guidance module 502 can organize the access points 212 by proximity to the starting point 208, the target destination 210, the current location 206, or a combination thereof. The route guidance module 502 can organize the access points 212 by arranging or ordering the access points 212 according to distance from a reference point, a travel direction, or a combination thereof for searching, indexing, or a combination thereof. The route guidance module 502 can also retrieve information on the road conditions or traffic patterns concerning the access points 212. For example, the route guidance module 502 can retrieve information on the traffic conditions concerning one of the access points 212 during commute hours.

The route guidance module 502 can determine the road type 316 of FIG. 3 of a portion of the navigation route 204. The route guidance module 502 can determine the road type 316 by accessing or searching the map database, the interest point database 232, or a combination thereof. The route guidance module can also use the first user interface 418, the second user interface 438, or a combination thereof to receive the road type 316 from the user. The route guidance module 502 can also use the location unit 420, the first control unit 412, the second control unit 434, or a combination thereof to determine the road type 316 based on a speed of the first device 102 or a frequency of stops.

The route guidance module 502 can associate the access points 212 with the road type 316. The route guidance module 502 can store the associations in the first storage unit 414, the second storage unit 446, or a combination thereof. The route guidance module 502 can use the first control unit 412, first control interface 422, the first storage unit 414, the second control unit 434, the second control interface 444, the second storage unit 446, or a combination thereof to associate the access points 212 with the road type 316 using labels, pointers, arrays, or a combination thereof.

The route guidance module 502 can further generate the navigation route 204 or determine associated locations, such as the current location 206, the access points 212 or a combination thereof, by communicating, such as by sending or receiving, the navigation route 204, the current location 206, the access points 212, the road type 316, or a combination thereof between devices. The route guidance module 502 can use the first control unit 412, the second control unit 434, the first communication unit 416, the second communication unit 436, or a combination thereof to communicate or receive the navigation route 204, the current location 206, the access points 212, the road type 316, or a combination thereof between devices.

After generating the navigation route 204 and identifying the access points 212 along the navigation route 204, the control flow can pass from the route guidance module 502 to the route segmentation module 504. The control flow can pass by having the navigation route 204, the current location 206, the access points 212, the road type 316, or a combination thereof as an output from the route guidance module 502 to an input of the route segmentation module 504.

The route segmentation module 504 is for determining the route segments 216 of FIG. 2 within the navigation route 204. The route segmentation module 504 can determine the route segments 216 by evaluating the navigation route 204 and dividing the navigation route 204 into the route segments 216. The route segmentation module 504 can divide the navigation route 204 into the route segments 216 when the navigation route 204 is considered the extended outing 228 of FIG. 2. The navigation route 204 can be considered the extended outing 228 when the length of the navigation route 204 exceeds the mileage threshold 234. The route segmentation module 504 can calculate the length of the navigation route 204 and compare the length of the navigation route 204 with the mileage threshold 234. The route segmentation module 504 can use the first control unit 412, the second control unit 434, or a combination thereof to calculate the length of the navigation route 204 and when the length of the navigation route 204 exceeds the mileage threshold 234.

The mileage threshold 234 can be a static distance threshold such as 50 miles, 200 miles, or 100 kilometers. The mileage threshold 234 can vary depending on the type of navigation requested. For example, the route segmentation module 504 can use a different instance of the mileage threshold 234 for a bicycle navigation than an automobile navigation. The mileage threshold 234 can also vary based on the interest density 222 of FIG. 2. Details regarding the interest density 222 will be discussed in the following sections.

The route segmentation module 504 can divide the navigation route 204 into the route segments 216 based on the segment length 218 of FIG. 2, the segment travel time 220 of FIG. 2, the interest density 222 of FIG. 2, or a combination thereof. The segment length 218 can be a length value, such as 10 miles, 5 kilometers, or 100 yards, predetermined by the navigation system 100 stored in the first storage unit 414, the second storage unit 446, or a combination thereof. Alternatively, the segment length 218 can be received from another device or system through the first communication interface 428 of FIG. 4, the second communication interface 450 of FIG. 4, or a combination thereof. The segment length 218 can increase as the processing power of the navigation system 100, or a portion thereof, increases.

The route segmentation module 504 can divide the navigation route 204 by the segment travel time 220 based on the road type 316, information concerning road conditions or traffic conditions along the navigation route 204, or a combination thereof. The road conditions can include a speed limit information, a road terrain information, a road elevation information, or a combination thereof. The route segmentation module 504 can determine the segment travel time 220 by accessing or searching the map database, the interest point database 232, or a combination thereof for the road conditions, the traffic conditions, or a combination thereof.

In addition, the route segmentation module 504 can use the first communication unit 416, the second communication unit 436, or a combination thereof to receive the road conditions, the traffic conditions, or a combination thereof from another device. Moreover, the route segmentation module 504 can use the first user interface 418, the second user interface 438, or a combination thereof to receive the road conditions, the traffic conditions, or a combination thereof from the user. The route segmentation module 504 can use the first control unit 412, the second control unit 434, or a combination thereof to determine the segment travel time 220 based on the road type 316, the road conditions, the traffic conditions, or a combination thereof.

For example, the route segmentation module 504 can determine that a portion of the navigation route 204 is a two-way road characterized as "mountainous terrain." The route segmentation module 504 can determine a traversal time-estimate corresponding to the portion of the navigation route 204 based on speed limit data. The route segmentation module 504 can divide this portion of the navigation route 204 into two instances of the route segments 216 where each segment equates to half of the traversal time-estimate.

The route segmentation module 504 can divide the navigation route 204 by the interest density 222. Details regarding the interest density 222 will be discussed in the following sections.

The route segmentation module 504 can store the route segments 216 in the first storage unit 414, the second storage unit 446, or a combination thereof. The route segmentation module 504 can also use the first control unit 412, the second control unit 434, or a combination thereof to determine the segment boundaries 224 of FIG. 2 based on the route segments 216. The route segmentation module 504 can store the segment boundaries 224 as coordinate values, relative distance values, or a combination thereof in the first storage unit 414, the second storage unit 446, or a combination thereof.

The route segmentation module 504 can further determine the current location 206 of the first device 102 relative to the segment boundaries 224 of FIG. 2. The route segmentation module 504 can use the location unit 420, the first control unit 412, the second control unit 434, the first storage unit 414, the second storage unit 446, or a combination thereof to determine the current location 206 relative to the segment boundaries 224.

The route guidance module 502 can communicate or receive the route segments 216, the segment boundaries 224, or a combination thereof between devices. The route guidance module 502 can use the first control unit 412, the second control unit 434, the first control interface 422, the second control interface 444, the first communication unit 416, the second communication unit 436, the first communication interface 428, the second communication interface 450, or a combination thereof to communicate or receive the route segments 216, the segment boundaries 224, or a combination thereof between devices.

After determining the route segments 216, the segment boundaries 224, or a combination thereof, the control flow can pass from the route segmentation module 504 to the interest point evaluation module 508. The control flow can pass by having the route segments 216, the segment boundaries 224, or a combination thereof as an output from the route segmentation module 504 to an input of the interest point evaluation module 508.

The interest point evaluation module 508 is for identifying the interest points 214 around the access points 212. The interest point evaluation module 508 can identify the interest points 214 by accessing or searching the interest point database 232. The interest point database 232 can be stored in the first storage unit 414, the second storage unit 446, or a combination thereof. Alternatively, the interest point database 232 can be stored in a storage unit of another system (not shown). The interest point evaluation module 508 can access or search the interest point database 232 using the first control unit 412, the second control unit 434, the first control interface 422, the first communication interface 428, the first communication unit 416, the second control interface 444, the second communication interface 450, the second communication unit 436, or a combination thereof.

The interest point evaluation module 508 can identify the interest points 214 based on a point proximity search 510, a point discovery threshold 514, or a combination thereof. The point proximity search 510 is a search for the interest points 214 within a distance radius 512 of each of the access points 212. For example, the point proximity search 510 can involve a search for the interest points 214 within a one mile radius of each of the access points 212. The interest point evaluation module 508 can apply the point discovery threshold 514 to the interest points 214 identified by the point proximity search 510.

The point discovery threshold 514 is a threshold cap for limiting the quantity of the interest points 214. The interest point evaluation module 508 can decrease the distance radius 512 when the quantity of the interest points 214 exceeds the point discovery threshold 514. For example, the interest point evaluation module 508 can set the distance radius 512 to one mile and the point discovery threshold 514 to 10 POIs.

The interest point evaluation module 508 can iteratively decrease the distance radius 512 of the point proximity search 510 until the quantity of the interest points 214 is less than the point discovery threshold 514. The interest point evaluation module 508 can also iteratively increase the distance radius 512 until the quantity of the interest points 214 is within a predefined numerical or percentage range of the point discovery threshold 514.

The interest point evaluation module 508 can determine the distance radius 512 based on the distance between the access points 212. In addition, the interest point evaluation module 508 can limit the distance radius 512 of the point proximity search 510 to half of the segment length 218 of the route segments 216.

The interest point evaluation module 508 can further categorize the interest points 214 using interest categories 516. The interest categories 516 are classifications of the interest points 214 by the types of POIs. For example, the interest categories 516 can include food, lodging, medical, fuel, or a combination thereof. The interest point evaluation module 508 can set a category threshold 518 based on each of the interest categories 516. The category threshold 518 is a threshold cap for limiting the quantity of the interest points 214 based on each of the interest categories 516. For example, the interest point evaluation module 508 can set the category threshold 518 as three fuel-related POIs, five food-related POIs, and one medical-related POI.

The interest point evaluation module 508 can further identify the interest points 214 based on the point proximity search 510, the category threshold 518, or a combination thereof. The interest point evaluation module 508 can iteratively increase or decrease the distance radius 512 of the point proximity search 510 until enough of the interest points 214 satisfy the category threshold 518 for each of the interest categories 516. Continuing the example from above, the distance radius 512 of the point proximity search 510 can be increased or decreased until the three fuel-related POIs, the five food-related POIs, and the one medical-related POI are identified.

The interest point evaluation module 508 can determine the point discovery threshold 514, the category threshold 518, or a combination thereof based on the road type 316. The interest point evaluation module 508 can receive the point discovery threshold 514, the category threshold 518, or a combination thereof as values predetermined by the navigation system 100 through the first communication interface 428, the second communication interface 450, or a combination thereof. In addition, the interest point evaluation module 508 can determine the point discovery threshold 514, the category threshold 518, or a combination thereof based on previous navigation sessions, past user behavior, or a combination thereof.

The interest point evaluation module 508 can use the first control unit 412, the second control unit 434, or a combination thereof to conduct the point proximity search 510. In addition, the interest point evaluation module 508 can store the interest points 214, the distance radius 512, the point discovery threshold 514, the category threshold 518, the interest categories 516, or a combination thereof in the first storage unit 414, the second storage unit 446, or a combination thereof.

The interest point evaluation module 508 can pass the control flow back to the route segmentation module 504 for determining the interest density 222 based on the interest points 214. The interest point evaluation module 508 can determine the interest density 222 by dividing the interest points 214 by the area calculated using the distance radius 512. Moreover, the interest point evaluation module 508 can determine the interest density 222 by dividing the point discovery threshold 514 by the area calculated using the distance radius 512.

The route segmentation module 504 can use the first control unit 412, the second control unit 434, or a combination thereof to determine the interest density 222 based on the interest points 214. The route segmentation module 504 can divide the navigation route 204 into the route segments 216 based on an instance of the segment length 218 predetermined by the navigation system 100. The route segmentation module 504 can then compare the interest density 222 of the route segments 216 against a threshold density value for determining whether to increase or decrease the segment length 218 of any of the route segments 216.

The interest point evaluation module 508 can further calculate the exit routes 306 of FIG. 3 and the return routes 308 of FIG. 3. The interest point evaluation module 508 can calculate the exit routes 306 and the return routes 308 using coordinate or geospatial information from the map database, the interest point database 232, or a combination thereof. The interest point evaluation module 508 can calculate the exit routes 306 and the return routes 308 using a tree traversal mechanism, a graph traversal mechanism, or a combination thereof.

More specifically, the interest point evaluation module 508 can use an A* algorithm, a Bellman-Ford algorithm, a bidirectional algorithm, a Dijkstra's algorithm, a Floyd-Warshall algorithm, an iterative deepening algorithm, a shortest path algorithm, or a combination thereof to calculate the exit routes 306 and the return routes 308. The interest point evaluation module 508 can also use the first control unit 412, first control interface 422, the second control unit 434, the second control interface 444, or a combination thereof to store the exit routes 306, the return routes 308, or a combination thereof in the first storage unit 414, the second storage unit 446, or a combination thereof.

It has been discovered that calculating the exit routes 306 and the return routes 308 associated with the access points 212 along the navigation route 204 in advance of receiving the interest point query 310 of FIG. 3 provides increased efficiency and usability. The offline calculations can result in faster route generation upon receiving the interest point query 310 compared to dynamically generating and processing such routes after receiving the interest point query 310. In addition, the routes generated from the pre-calculated instances of the exit routes 306 and the return routes 308 improves the accuracy of such routes.

The interest point evaluation module 508 can communicate or receive the interest points 214, the distance radius 512, the point discovery threshold 514, the category threshold 518, the interest categories 516, the exit routes 306, the return routes 308, or a combination thereof between devices. The interest point evaluation module 508 can use the first control unit 412, the second control unit 434, the first control interface 422, the second control interface 444, the first communication unit 416, the second communication unit 436, the first communication interface 428, the second communication interface 450, or a combination thereof to communicate or receive the interest points 214, the distance radius 512, the point discovery threshold 514, the category threshold 518, the interest categories 516, the exit routes 306, the return routes 308, or a combination thereof between devices.

After identifying the interest points 214, the control flow can pass from the interest point evaluation module 508 to the set generation module 520. The control flow can pass by having the interest points 214, the interest categories 516, the exit routes 306, the return routes 308, or a combination thereof as an output from the interest point evaluation module 508 to an input of the set generation module 520. Similarly, the control flow can pass between the interest point evaluation module 508 and the route segmentation module 504 as described above.

The set generation module 520 is for generating the route-specific point set 230 of FIG. 2 based on the navigation route 204, the access points 212, the interest points 214, the interest categories 516, the exit routes 306, the return routes 308, the locational profile 324 of FIG. 3, or a combination thereof. The set generation module 520 can associate each of the interest points 214 along the navigation route 204 with corresponding instances of the access points 212, the interest categories 516, the exit routes 306, the return routes 308, the locational profile 324, or a combination thereof.

The set generation module 520 can use the first control unit 412, the first control interface 422, the second control unit 434, the second control interface 444, or a combination thereof to access the interest points 214, the access points 212, or a combination thereof from the interest point database 232. The set generation module 520 can then use the first control unit 412, the second control unit 434, or a combination thereof to associate the interest points 214 with the access points 212, the interest categories 516, the exit routes 306, the return routes 308, the locational profile 324, or a combination thereof and to store the associations in the first storage unit 414, the second storage unit 446, or a combination thereof.

The set generation module 520 can also arrange or sort the interest points 214 of the route-specific point set 230 by the access points 212. The set generation module 520 can also arrange or sort the access points 212 by proximity to the starting point 208, the target destination 210, predefined reference points along the navigation route 204, or a combination thereof. The set generation module 520 can further arrange or sort the interest points 214 by the interest categories 516 before arranging or sorting the interest points 214 by the access points 212.

The set generation module 520 can also arrange or sort the interest points 214 by the lengths of the exit routes 306, the return routes 308, or a combination thereof. The set generation module 520 can also convert the lengths of the exit routes 306, the return routes 308, or a combination thereof into estimated travel times based on speed limit data, road conditions, or a combination thereof. The set generation module 520 can also arrange or sort the interest points 214 by the estimated travel times.

The set generation module 520 can identify the locational profile 324 concerning one or more of the interest points 214 by accessing or searching the map database, the interest point database 232, a review database, a business intelligence database, or a combination thereof. The set generation module 520 can access the map database, the interest point database 232, the review database, the business intelligence database, or a combination thereof using the first control unit 412, the second control unit 434, the first control interface 422, the second control interface 444, the first communication unit 416, the second communication unit 436, or a combination thereof.

The set generation module 520 can also receive the locational profile 324 concerning one or more of the interest points 214 from a user of the navigation system 100 through the first user interface 418, the second user interface 438, or a combination thereof. Moreover, the set generation module 520 can use the first control unit 412, the second control unit 434, the first communication unit 416, the second communication unit 436, or a combination thereof to receive the locational profile 324 from another device. The set generation module 520 can also store the received instance of the locational profile 324 concerning the interest points 214 in the first storage unit 414, the second storage unit 446, or a combination thereof.

The set generation module 520 can generate the route-specific point set 230 as a relational database, an array database, a columnar database, an object oriented database, or a combination thereof. More specifically, the set generation module 520 can generate the route-specific point set 230 as an adjacency array, a hierarchical array, or a combination thereof. The set generation module 520 can use the first control unit 412, the second control unit 434, or a combination thereof to generate the route-specific point set 230. The set generation module 520 can also store the route-specific point set 230 in the first storage unit 414, the second storage unit 446, or a combination thereof.

The set generation module 520 can communicate or receive the route-specific point set 230 between devices. The set generation module 520 can use the first control unit 412, the second control unit 434, the first control interface 422, the second control interface 444, the first communication unit 416, the second communication unit 436, the first communication interface 428, the second communication interface 450, or a combination thereof to communicate or receive the route-specific point set 230 between devices.

The set generation module 520 can generate the route-specific point set 230 corresponding to the route segments 216. The set generation module 520 can generate the route-specific point set 230 for the instance of the route segments 216 closest to the starting point 208 concurrently with or immediately after the generation of the navigation route 204.

The set generation module 520 can pass the control flow back to the route segmentation module 504 for selecting a different instance of the route segments 216. The set generation module 520 can use the current location 206 of the first device 102 to determine when to generate the route-specific point set 230 for the next instance of the route segments 216.

The route segmentation module 504 can determine a distance trigger 506 for when to generate the route-specific point set 230. The distance trigger 506 can be a distance value, a percentage value, or a combination thereof. The distance trigger 506 can be determined based on the segment boundaries 224, the segment length 218, or a combination thereof. The distance trigger 506 can be a distance value or a percentage value predetermined by the navigation system 100. As a more specific example, the distance trigger 506 can be when the current location 206 is 10 kilometers from the next ensuing instance of the segment boundaries 224 or when 70% of the segment length 218 has been traversed.

The set generation module 520 can generate the route-specific point set 230 corresponding to an upcoming instance of the route segments 216 along the navigation route 204 when the current location 206 reaches or satisfies the distance trigger 506. Alternatively, the route segmentation module 504 can generate the route-specific point set 230 when the current location 206 is traversing or located in the access gap 226 of FIG. 2.

For example, the set generation module 520 can use the location unit 420, the first control unit 412, the first control interface 422, the first communication unit 416, the second communication unit 436, the second control unit 434, or a combination thereof to determine when the current location is traversing or located in the access gap 226. The set generation module 520 can then generate the route-specific point set 230 for the next ensuing instance of the route segments 216 while the user is traversing or located in the access gap 226.

The set generation module 520 can also generate more than one instance of the route-specific point set 230 when the current location 206 reaches or satisfies the distance trigger 506 or when the current location 206 is traversing or located in the access gap 226. The set generation module 520 can store the instances of the route-specific point set 230 in the first storage unit 414, the second storage unit 446, or a combination thereof.

It has been discovered that generating the route-specific point set 230 based on the navigation route 204 prior to receiving the interest point query 310 provides a method for quickly and systematically locating, counting, and categorizing the interest points 214 near the access points 212. The navigation system 100 can search the route-specific point set 230 rather than the interest point database 232. The smaller size of the route-specific point set 230 compared to the interest point database 232 provides for convenient storage on client devices or server devices.

It has been discovered that generating the route-specific point set 230 when the current location 206 of the first device 102 is traversing the access gap 226 provides improved resource efficiency. Generating the route-specific point set 230 when interaction with or guidance for the user is not necessary reduces the likelihood of the processing power of the navigation system 100 being diverted away from processing the interest point query 310 and generating the route-specific point set 230 for the ensuing instances of the route segments 216.

After identifying the interest points 214, the control flow can pass from the set generation module 520 to the query module 522. The control flow can pass by having the route-specific point set 230 as an output from the set generation module 520 to an input of the query module 522. Similarly, as described above, the control flow can pass between the set generation module 520 and the route segmentation module 504.

The query module 522 is for receiving the interest point query 310, generating the alternative interest suggestion 314 of FIG. 3 from the interest point query 310, and determining the interest points 214 satisfying the interest point query 310, the alternative interest suggestion 314, or a combination thereof. The query module 522 can receive the interest point query 310 from the user through the first user interface 418, the second user interface 438, or a combination thereof.

The query module 522 can also use the first communication unit 416, the first communication interface 428, the first control unit 412, the second communication unit 436, the second communication interface 450, the second control unit 434, or a combination thereof to receive or communicate the interest point query 310 from or to another device. The query module 522 can further use the first communication unit 416, the first communication interface 428, the first control unit 412, the second communication unit 436, the second communication interface 450, the second control unit 434, the location unit 420, or a combination thereof to receive the interest point query 310 from a vehicle or mode of transportation carrying the user.

The query module 522 can further classify the interest point query 310 by one or more of the interest categories 516. The query module 522 can use the first control unit 412, the first control interface 422, the second control unit 434, the second control interface 444, or a combination thereof to store the interest point query 310 in the first storage unit 414, the second storage unit 446, or a combination thereof.

The query module 522 can determine a detour tolerance 524 after receiving the interest point query 310. The detour tolerance 524 is a numerical value or categorical classification assigned to the interest point query 310. The detour tolerance 524 can represent an estimated willingness to deviate from the navigation route 204 to reach the interest points 214 satisfying the interest point query 310. For example, the detour tolerance 524 can be a number value in a number range where the highest number in the number range indicates a greater willingness to deviate from the navigation route 204.

The query module 522 can determine the detour tolerance 524 based on a timing of the interest point query 310, an urgency level of the interest point query 310, a past instance of the interest point query 310, or a combination thereof. The query module 522 can also determine the detour tolerance 524 based on the interest categories 516 corresponding to the interest point query 310. The query module 522 can determine the detour tolerance 524 using a machine-learning mechanism, a pattern-recognition mechanism, or a combination thereof. The query module 522 can determine the detour tolerance 524 using the first control unit 412, the second control unit 434, or a combination thereof.

The query module 522 can identify the intention criteria 312 of FIG. 3 corresponding to the interest point query 310. The query module 522 can identify the intention criteria 312 based on rules, methods, logical connections, or a combination thereof provided or predetermined by the navigation system 100. The query module 522 can also identify the intention criteria 312 based on the interest categories 516 corresponding to the interest point query 310. The query module 522 can further identify the intention criteria 312 based on a timing of the interest point query 310, a past instance of the interest point query 310, or a combination thereof. The query module 522 can identify the intention criteria 312 using the first control unit 412, the second control unit 434, or a combination thereof.

The query module 522 can also generate the alternative interest suggestion 314 from the interest point query 310 based on the intention criteria 312. The alternative interest suggestion 314 can be a similar instance of the interest point query 310 corresponding to similar instances of the interest categories 516. For example, the alternative interest suggestion 314 can be a suggestion for a similar type of POI or a POI offering the same goods, amenities, services, or a combination thereof as the POI sought by the interest point query 310.

The query module 522 can generate the alternative interest suggestion 314 based on a timing of the interest point query 310, a past instance of the interest point query 310, a past behavior of the user, a past route traveled by the user, past instances of the interest points 214 frequented by the user, or a combination thereof. The query module 522 can generate the alternative interest suggestion 314 using a machine learning mechanism, a pattern-recognition mechanism, or a combination thereof. The query module 522 can use the first control unit 412, the second control unit 434, or a combination thereof to generate the alternative interest suggestion 314. Moreover, the query module 522 can also determine the detour tolerance 524 for the alternative interest suggestion 314.

The query module 522 can use the route-specific point set 230 to determine the interest points 214 satisfying the interest point query 310, the alternative interest suggestion 314, or a combination thereof. The query module 522 can determine the interest points 214 by searching, filtering, or sorting the route-specific point set 230 according to terms or keywords associated with the interest point query 310, the alternative interest suggestion 314, or a combination thereof.

The query module 522 can also determine the interest points 214 based on the detour tolerance 524 of the interest point query 310, the alternative interest suggestion 314, or a combination thereof. The query module 522 can use rules, methods, filters, or a combination thereof to determine the interest points 214 based on the detour tolerance 524. For example, the query module 522 can establish a default filter to exclude the interest points 214 requiring the user to backtrack on the navigation route 204. The query module 522 can remove the filter when the detour tolerance 524 of the interest point query exceeds a threshold value or falls under a category representing a greater willingness to deviate from the navigation route 204.

Similarly, when the navigation route 204 is divided into the route segments 216, the query module 522 can limit the navigation system's access to the route-specific point set 230 associated with one or more of the route segments 216. For example, the query module 522 can establish a default rule to only search or filter the route-specific point set 230 of one or more of the route segments 216 in advance of the current location 206.

The query module 522 can disregard this rule when the detour tolerance 524 of the interest point query exceeds the threshold value or falls under the category representing a greater willingness to deviate from the navigation route 204. In this case, the query module 522 can search or filter the route-specific point set 230 of one or more of the route segments 216 traversed by the user.

The query module 522 can determine the interest points 214 using the first control unit 412, the second control unit 434, or a combination thereof. The query module 522 can also use the first control interface 422, the second control interface 444, or a combination thereof when accessing the route-specific point set 230 from the first storage unit 414, the second storage unit 446, or a combination thereof.

It has been discovered that determining the interest points 214 from the route-specific point set 230 based on the detour tolerance 524 of the interest point query 310, the alternative interest suggestion 314, or a combination thereof provides for more route-relevant search results. The detour tolerance 524 of the interest point query 310, the alternative interest suggestion 314, or a combination thereof can provide an indication to the navigation system 100 of how much of the route-specific point set 230 should be searched. Determining the detour tolerance 524 can make searches of the route-specific point set 230 more efficient and relevant to the user.

It has been discovered that generating the alternative interest suggestion 314 provides the user of the navigation system 100 with more options for POIs and more detour possibilities. Generating the alternative interest suggestion 314 also reduces the likelihood of the route-specific point set 230 not containing enough of the interest points 214 to satisfy the user's interest point query 310. Generating the alternative interest suggestion 314 allows the navigation system 100 to obtain a sufficient number of search results from the route-specific point set 100 for meeting the user's interest point query 310.

The query module 522 can calculate a detour cost 526 associated with reaching the interest points 214 satisfying the interest point query 310, the alternative interest suggestion 314, or a combination thereof. The detour cost 526 is a distance cost, an estimated time cost, or a combination thereof for reaching a POI from a navigation path and returning to the navigation path. For example, the detour cost 526 can be the distance cost, the estimated time cost, or a combination thereof for reaching one or more of the interest points 214 satisfying the interest point query 310 or the alternative interest suggestion 314 from the navigation route 204.

The detour cost 526 can be calculated using the access routes 304 of FIG. 3 and pre-calculated instances of the exit routes 306, the return routes 308, or a combination thereof. The query module 522 can calculate a time instance of the detour cost 526 by using information provided or predetermined by the navigation system 100 concerning road conditions, the road type 316, or a speed limit data concerning the access routes 304, the exit routes 306, the return routes 308, or a combination thereof. The query module 522 can calculate the detour cost 526 using the first control unit 412, the second control unit 434, or a combination thereof.

The query module 522 can rank or sort the interest points 214 by the detour cost 526 associated with each of the interest points 214. The query module 522 can rank or sort the interest points 214 using the first control unit 412, the second control unit 434, or a combination thereof.

The query module 522 can use the first control unit 412, the first user interface 418, the first display interface 430 of FIG. 4, the second control unit 434, the second user interface 438, the second display interface 440 of FIG. 4, or a combination thereof to display the interest points 214, the alternative interest suggestion 314, or a combination thereof to the user. The query module 522 can also use the first control unit 412, the first user interface 418, the first display interface 430, the second control unit 434, the second user interface 438, the second display interface 440, or a combination thereof to display the ranking or sorting of the interest points 214 based on the detour cost 526.

For example, the interest points 214 can be displayed as a ranked list based on the detour cost 526. In addition, the query module 522 can generate a suggestion or message emphasizing one of the interest points 214 over another of the interest points 214 based on the detour cost 526. The query module 522 can also use the first control unit 412, the first user interface 418, the first display interface 430, the second control unit 434, the second user interface 438, the second display interface 440, or a combination thereof to display the locational profile 324 of the interest points 214 satisfying the interest point query 310, the alternative interest suggestion 314, or a combination thereof.

The query module 522 can communicate or receive the interest points 214 determined from the route-specific point set 230 between devices. The query module 522 can use the first control unit 412, the second control unit 434, the first control interface 422, the second control interface 444, the first communication unit 416, the second communication unit 436, the first communication interface 428, the second communication interface 450, or a combination thereof to communicate or receive the interest points 214 between devices.

After determining the interest points 214, the control flow can pass from the query module 522 to the detour module 528. The control flow can pass by having the interest points 214 as an output from the query module 522 to an input of the detour module 528.

The detour module 528 is for generating the detour route 302 of FIG. 3 for reaching the interest points 214 satisfying the interest point query 310, the alternative interest suggestion 314, or a combination thereof from the navigation route 204. The detour module 528 can generate the detour route 302 based on the access routes 304, the exit routes 306, the return routes 308, or a combination thereof. The detour module 528 can generate the detour route 302 by accessing information from the route-specific point set 230 instead of the interest point database 232.

The detour module 528 can generate the detour route 302 by calculating the access routes 304 from the current location 206 to one of the access points 212. The detour module 528 can then use pre-calculated instances of the exit routes 306, the return routes 308, or a combination thereof to calculate the remainder of the detour route 302. The access routes 304 can vary depending on the detour tolerance 524 of the interest point query 310, the alternative interest suggestion 314, or a combination thereof.

For example, a higher instance of the detour tolerance 524 can result in the access routes 304 requiring the user to backtrack on the navigation route 204. In this example the detour module 528 can calculate the access routes 304 based the access points 212 passed by the user. The detour module 528 can determine the access routes 304 using a tree traversal mechanism, a graph traversal mechanism, or a combination thereof.

The detour module 528 can generate different instances of the detour route 302 based on different instances of the exit routes 306, the return routes 308, or a combination thereof. The detour module 528 can also update or revise the detour route 302 when the navigation system 100 receives the road condition alert of FIG. 3. The detour module 528 can also rank or list the different instances of the detour route 302 by the detour cost 526. The detour module 528 can use the first control unit 412, the first control interface 422, the location unit 420, the second control unit 434, or a combination thereof to generate the detour route 302.

It has been discovered that generating the detour route 302 for reaching the interest points 214 based on information from the route-specific point set 230 provides for faster route generation times and an improved user experience. The amount of time required to calculate the detour route 302 once the interest point query 310 is received can be greatly reduced using pre-calculated instances of the exit routes 306, the return routes 308, or a combination thereof. The access routes 304 are also convenient to calculate as the access routes 304 often mirror the navigation route 204.

The detour module 528 can communicate or receive the detour route 302 between devices. The detour module 528 can use the first control unit 412, the second control unit 434, the first control interface 422, the second control interface 444, the first communication unit 416, the second communication unit 436, the first communication interface 428, the second communication interface 450, or a combination thereof to communicate or receive the detour route 302 between devices.

After determining the detour route 302, the control flow can pass from the detour module 528 to the set tuning module 530. The control flow can pass by having the access points 212, the detour route 302, the interest points 214, the route-specific point set 230 as an output from the detour module 528 to an input of the set tuning module 530.

The set tuning module 530 is for adjusting the route-specific point set 230 in response to a historical travel pattern 532, a real-time road information, or a combination thereof. The real-time road information can include the road condition alert 322. In addition, the real-time road information can include a crowd-sourced information received from other devices, a road information received from the navigation system 100, or a combination thereof.

The historical travel pattern 532 is information concerning the past travel behavior of the user of the navigation system 100. The historical travel pattern 532 can include past instances of the interest point query 310 received from the user, the access points 212 previously used by the user, the detour route 302 previously traveled by the user, the interest points 214 previously visited by the user, or a combination thereof.

The set tuning module 530 can determine the historical travel pattern 532 by tracking and storing the travel behavior of the user. The set tuning module 530 can use the location unit 420, the first control unit 412, the first control interface 422, the second control unit 434, the second control interface 444, or a combination thereof to store the historical travel pattern 532 in the first storage unit 414, the second storage unit 446, or a combination thereof.

The set tuning module 530 can also use the first control unit 412, the second control unit 434, or a combination thereof to store previously generated instances of the route-specific point set 230, the detour route 302, or a combination thereof in the first storage unit 414, the second storage unit 446, or a combination thereof.

The set tuning module 530 can receive the road condition alert 322 from another device, the navigation system 100, or a combination thereof. For example, the set tuning module 530 can receive the road condition alert 322 from the device of another user traveling on the same stretch or the same portion of the navigation route 204. The road condition alert 322 can include information concerning road closures, accidents, exit or outlet closures, or a combination thereof. In addition, the road condition alert 322 can include real-time traffic information.

The set tuning module 530 can communicate or receive the historical travel pattern 532, the road condition alert 322, or a combination thereof between devices. The set tuning module 530 can use the first control unit 412, the second control unit 434, the first control interface 422, the second control interface 444, the first communication unit 416, the second communication unit 436, the first communication interface 428, the second communication interface 450, or a combination thereof to communicate or receive the historical travel pattern, the road condition alert 322, or a combination thereof between devices.

It has been discovered that adjusting the route-specific point set 230 in response to the historical travel pattern, the road condition alert 322, or a combination thereof provides for more relevant and up-to-date search results to the user of the navigation system 100. By culling the route-specific point set 230 of seldom used instances of the access points 212, the interest points 214, or a combination thereof, the navigation system 100 can offer more tailored search results quickly and efficiently.

After receiving the road condition alert 322 and determining the historical travel pattern 532, the set tuning module 530 can pass the control flow back to the set generation module 520 for adjusting the route-specific point set 230 based on the historical travel pattern 532, the road condition alert 322, or a combination thereof. The set generation module 520 can use a machine-learning mechanism, a pattern-recognition mechanism, a training mechanism, or a combination thereof to adjust the route-specific point set 230. The set generation module 520, the set tuning module 530, or a combination thereof can use the first control unit 412, the second control unit 434, or a combination thereof to adjust the route-specific point set 230.

For example, the set generation module 520 can use the information from the set tuning module 530 to exclude certain of the access points 212 and their corresponding instances of the interest points 214 from being included in future or upcoming instances of the route-specific point set 230. The set generation module 520 can exclude the access points 212 when the historical travel pattern 532 indicates no prior usage of the access points 212 in similar trips involving the navigation route 204. Moreover, the set generation module 520 can use the information from the set tuning module 530 to add new instances of the access points 212, the interest points 214, the exit routes 306, the return routes 308, or a combination thereof to future or upcoming instances of the route-specific point set 230.

The modules in FIG. 5 can be implemented by hardware acceleration units (not shown) in the control units. The modules in FIG. 5 can also be implemented by separate hardware units (not shown) outside the control units but with the first device 102 or the second device 106.

The modules described in this application can be implemented as instructions stored on a non-transitory computer readable medium to be executed by a first control unit 412, the second control unit 434, or a combination thereof. The non-transitory computer medium can include the first storage unit 414, the second storage unit 446, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 6:
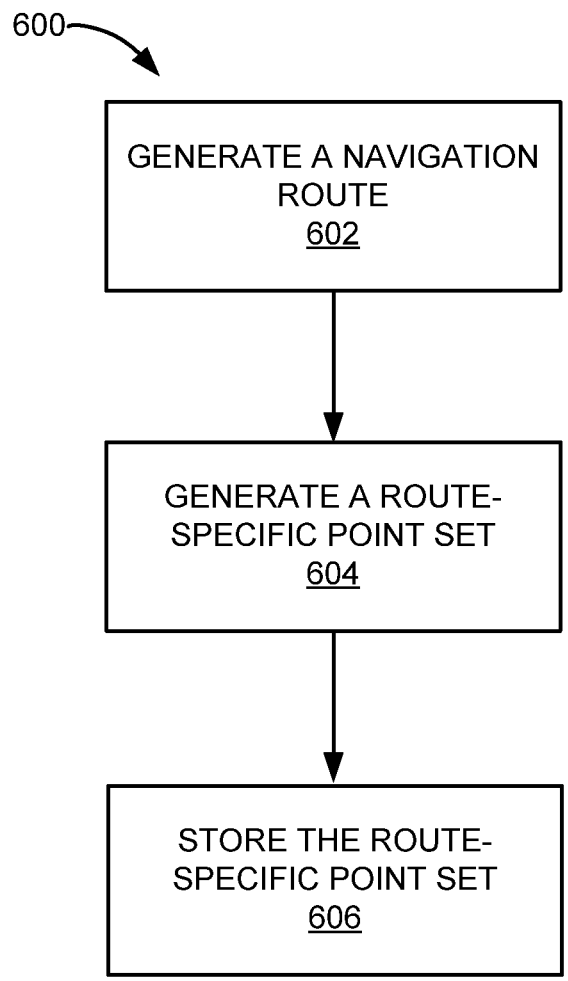
FIG. 6 is a flow chart of a method of operation of the navigation system in a further embodiment of the present invention.

Referring now to FIG. 6, therein is shown a flow chart of a method 600 of operation of the navigation system 100 in a further embodiment of the present invention. The method 600 includes: generating, with a control unit 412 a navigation route 204 in a block 602; generating a route-specific point set 230 based on the navigation route 204 prior to an interest point query 310 for representing a portion of an interest point database 232 in a block 604; and storing, with a storage unit 414 coupled to the control unit 412, the route-specific point set 230 in a block 606.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A navigation system comprising:
a control unit, configured to:
generate a navigation route including an access point for connecting the navigation route with a different path;
generate a route-specific point set based on the access point of the navigation route without an interest point query, the route-specified point set for representing a portion of an interest point database; and
a storage unit, coupled to the control unit, configured to:
store the route-specific point set.

2. The system as claimed in claim 1 wherein the control unit is configured to:
determine route segments within the navigation route; and
generate the route-specific point set corresponding to the route segments.

3. The system as claimed in claim 1 wherein the control unit is configured to generate the route-specific point set by further being configured to:
identify the access point along the navigation route;
identify interest points around the access point from the interest point database and a locational profile concerning the interest points; and
generate the route-specific point set based on one or more of the access point, the interest points, the locational profile, or a combination thereof.

4. The system as claimed in claim 1 wherein the control unit is configured to:
receive the interest point query after generating the route-specific point set;

determine a detour tolerance based on the interest point query;
determine interest points from within the route-specific point set for satisfying the interest point query;
calculate a detour cost for reaching the interest points from the navigation route; and
generate a detour route based on one or more of the detour tolerance, the detour cost, the route-specific point set, or a combination thereof.

5. The system as claimed in claim 1 wherein the control unit is configured to:
receive the interest point query;
identify an intention criteria corresponding to the interest point query;
generate an alternative interest suggestion from the interest point query based on the intention criteria; and
generate a detour route based on one or more of the alternative interest suggestion, the route-specific point set, or a combination thereof.

6. The system as claimed in claim 1 wherein the control unit is configured to:
determine a road type associated with a portion of the navigation route; and
generate the route-specific point set based on the road type.

7. The system as claimed in claim 1 wherein the control unit is configured to:
receive the interest point query;
generate a detour route based on the interest point query and the route-specific point set for searching the route-specific point set instead of the interest point database.

8. The system as claimed in claim 1 wherein the control unit is configured to generate the route-specific point set by further being configured to:
Identify the access point along the navigation route;
identify interest points around the access point;
calculate exit routes for reaching the interest points from the access point; and
calculate return routes for reaching the navigation route from the interest points.

9. The system as claimed in claim 1 wherein the control unit is configured to:
receive a road condition alert;
generate the route-specific point set based on the road condition alert.

10. The system as claimed in claim 1 wherein the control unit is configured to:
determine a historical travel pattern; and
generate the route-specific point set based on the historical travel pattern.

11. A method of operation of a navigation system comprising:
generating, with a control unit, a navigation route including an access point for connecting the navigation route with a different;
generating a route-specific point set based on the access point of the navigation route without an interest point query, the route-specific point for representing a portion of an interest point database; and
storing the route-specific point set.

12. The method as claimed in claim 11 further comprising:
determining route segments within the navigation route; and
generating the route-specific point set corresponding to the route segments.

13. The method as claimed in claim 11 wherein generating the route-specific point set includes:
identifying the access point along the navigation route;
identifying interest points around the access point from the interest point database and a locational profile concerning the interest points; and
generating the route-specific point set based on one or more of the access point, the interest points, the locational profile, or a combination thereof.

14. The method as claimed in claim 11 further comprising:
receiving the interest point query after generating the route-specific point set;
determining a detour tolerance based on the interest point query;
determining interest points for satisfying the interest point query;
calculating a detour cost for reaching the interest points from the navigation route; and
generating a detour route based on one or more of the detour tolerance, the detour cost, the route-specific point set, or a combination thereof.

15. The method as claimed in claim 11 further comprising:
receiving the interest point query;
identifying an intention criteria corresponding to the interest point query;
generating an alternative interest suggestion from the interest point query based on the intention criteria; and
generating a detour route based on one or more of the alternative interest suggestion, the route-specific point set, or a combination thereof.

16. A non-transitory computer readable medium, including instructions for execution, comprising:
generating a navigation route including an access point for connecting the navigation route with a different path,
generating a route-specific point set based on the access point of the navigation route without an interest point query, the route-specific point set for representing a portion of an interest point database; and
storing the route-specific point set.

17. The non-transitory computer readable medium as claimed in claim 16 further comprising:
determining route segments within the navigation route; and
generating the route-specific point set corresponding to the route segments.

18. The non-transitory computer readable medium as claimed in claim 16 wherein generating the route-specific point set includes:
identifying the access point along the navigation route;
identifying interest points around the access point from the interest point database and a locational profile concerning the interest points; and
generating the route-specific point set based on one or more of the access point, the interest points, the locational profile, or a combination thereof.

19. The non-transitory computer readable medium as claimed in claim 16 further comprising:
receiving the interest point query after generating the route-specific point set;
determining a detour tolerance based on the interest point query;
determining interest points for satisfying the interest point query;
calculating a detour cost for reaching the interest points from the navigation route; and
generating a detour route based on one or more of the detour tolerance, the detour cost, the route-specific point set, or a combination thereof.

20. The non-transitory computer readable medium as claimed in claim 16 further comprising:

receiving the interest point query;
identifying an intention criteria corresponding to the interest point query;
generating an alternative interest suggestion from the interest point query based on the intention criteria; and
generating a detour route based on one or more of the alternative interest suggestion, the route-specific point set, or a combination thereof.

* * * * *